United States Patent [19]
Richter, Jr.

[11] 3,776,319
[45] Dec. 4, 1973

[54] IMPROVEMENT IN AN ACCESSORY FOR A RIGHT-ANGLE DRILL TOOL

[75] Inventor: Alfred G. Richter, Jr., Granada Hills, Calif.

[73] Assignee: Lockheed Aircraft Corporation, Burbank, Calif.

[22] Filed: Jan. 19, 1972

[21] Appl. No.: 219,043

[52] U.S. Cl. .................... 173/36, 173/159, 408/92, 408/130
[51] Int. Cl. .... E21c 5/11, B23b 45/14, B23b 41/00
[58] Field of Search ............................ 173/36, 159; 408/130, 92

[56] References Cited
UNITED STATES PATENTS

| | | | |
|---|---|---|---|
| 1,046,861 | 12/1912 | Sanderson et al. | 408/130 X |
| 1,142,802 | 6/1915 | Didier | 408/130 X |

FOREIGN PATENTS OR APPLICATIONS

| | | | |
|---|---|---|---|
| 753,249 | 7/1956 | Great Britain | 408/92 |

*Primary Examiner*—Francis S. Husar
*Attorney*—Frank L. Zugelter et al.

[57] ABSTRACT

A portable accessory for mounting on a right-angle motorized drill tool whereby steady force to the tool's drill bit is supplied by means of reaction of its plunger, actuated pneumatically or hydraulically, against fixed bracing structure. The plunger is mounted on a reciprocable piston in the chamber of its cylinder or casing which is secured in a cooperative manner to a station along the length of the drill tool, preferably directly behind and in line with the axis of the drill bit. The cylinder is connected to a source of fluid power, say, by way of a three-way valve connected to an adapter fitted to the tool motor's ingress port, the portable ram thus being operated by the same source. An adjustable link chain mounted to the cylinder secures the device to the station on the drill tool. Upon operation of the drill tool, regulated pressure is fed to the ram through incorporation of the three-way valve in the circuit to the cylinder's chamber thereby actuating or reciprocating the plunger in a direction opposite to the line of drilling by the drill bit. The fixed bracing structure is engaged by the plunger's exposed free end, or extension thereto, causing a force reaction in the direction of the drill bit. This accessory provides stability to the tool in a drilling operation, accuracy of position, and ease in drilling a hole, particularly in a hard metal, examples of which are titanium and Inconel 714.

3 Claims, 3 Drawing Figures

PATENTED DEC 4 1973
3,776,319
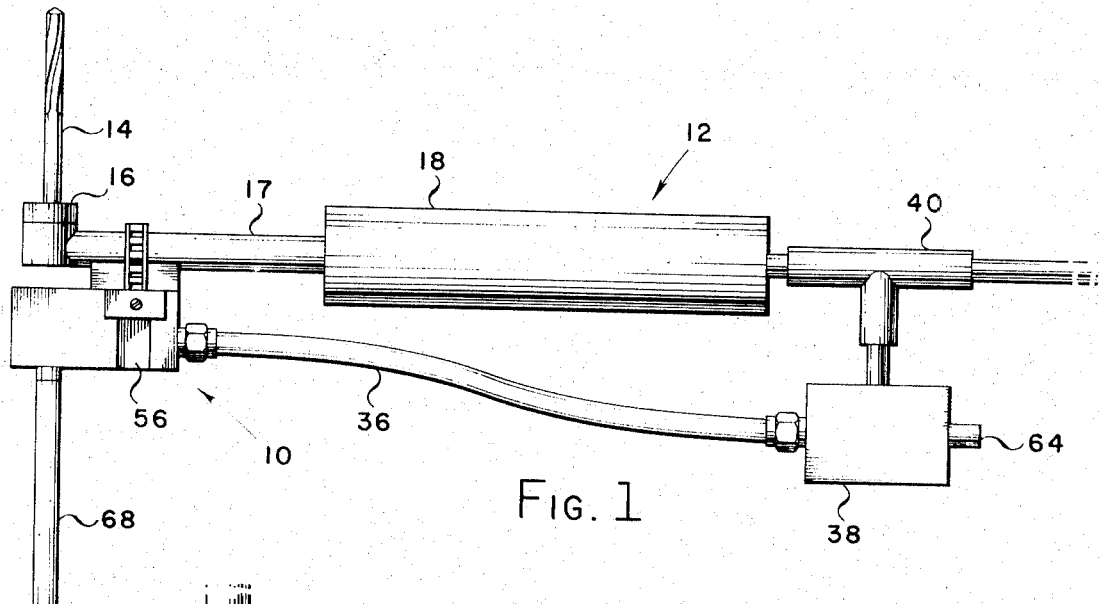
FIG. 1
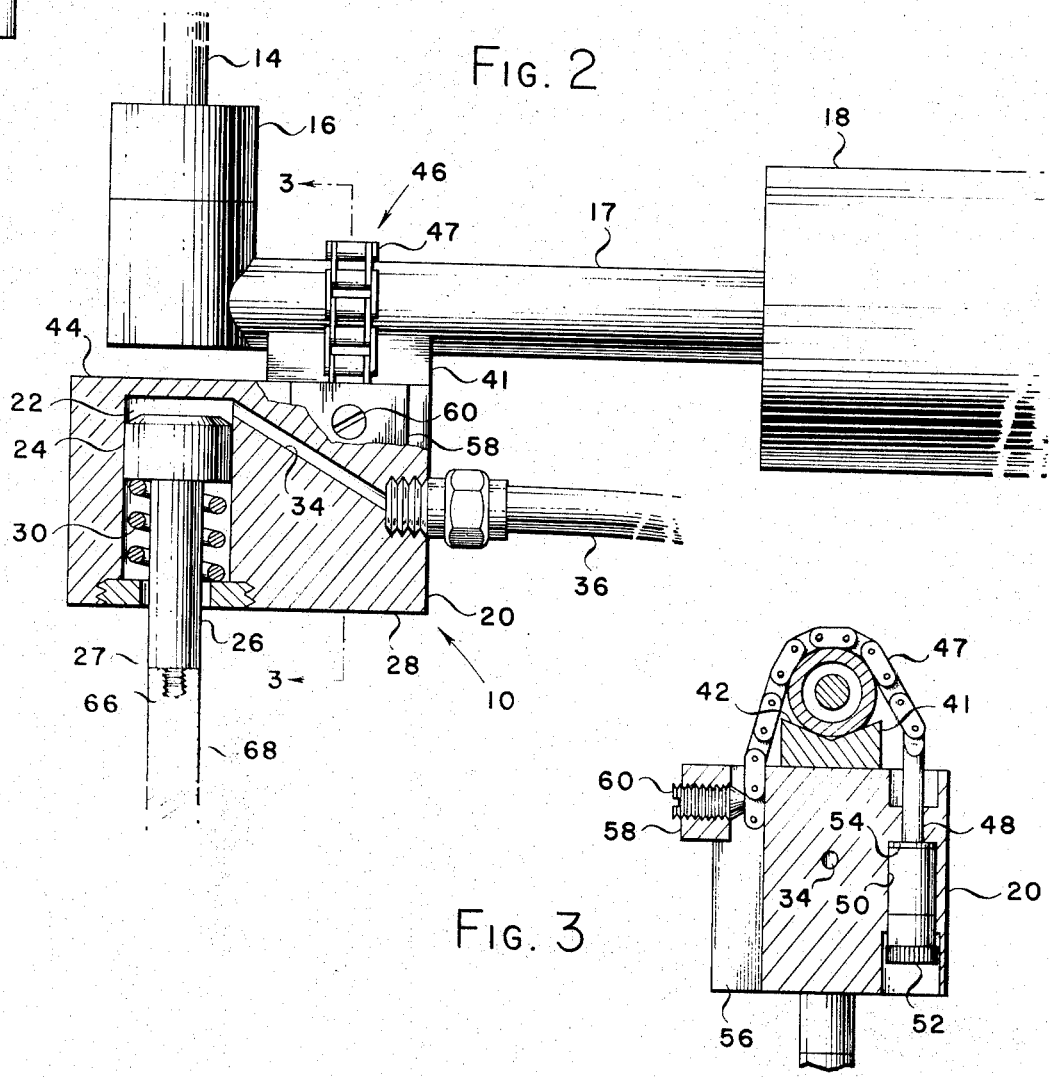
FIG. 2
FIG. 3

IMPROVEMENT IN AN ACCESSORY FOR A RIGHT-ANGLE DRILL TOOL

BACKGROUND OF THE INVENTION

1. Field of the Invention

The field of art to which the invention is most likely to pertain is located in a class of devices generally relating to motorized drilling devices. Classes 10, Bolt, Nail, Rivet and Screw Making; 77, Boring and Drilling; and 408, Cutting by Use of Rotating Axially Moving Tool, U. S. Patent Office Classifications, may be applicable general areas of art in which the claimed subject matter of the type involved here may be classified.

1. Description of the Prior Art

Examples of prior devices in the arts to which this invention most likely pertains are U.S. Letters Patent Nos. 1,599,364; 2,277,576; 2,395,018; 2,492,783; 2,947,205; and 3,158,883.

Problems Encountered

In the fabrication of aircraft fuselage or body sections, or other workpieces, a great number of holes are required for riveting and other purposes. Various kinds of motorized drill tools are used to drill such holes. In production assembly work, the least time that is involved to drill all the required holes in a workpiece is sought, and simultaneously, meeting aircraft specifications, thereby minimizing dollar costs or reduction thereof, and realizing minimum reworking efforts. Furthermore, obstructions to use of a drill tool by an operator exist by reason of the configuration of the jigs and-/or supporting chassis provided for the fuselage section or workpiece during performance of the drilling operations. Consequently, limited space is only available in many instances, for drilling by the operator.

Another problem is the difficulty of consistently providing a uniform force to the drill bit performing on a hard metal, as in a series of hole drilling operations. In many cases, manual pressure is either insufficient or laborious with the operator. A drill bit is often broken after a relatively few number of drilling operations. This is particularly true in regard to use of a right-angle tool drill in which the operator is limited in his application of manual pressure to either the tool chuck or its housing. Such housing is displaced laterally from the drilling hole area. This in turn creates the problem of instability of the tool as it drills, in that it wobbles or moves from side to side, affecting the line of drilling and ultimately the quality and alignment of the drilled hole. The quality of a hole is a function of the stability of use of its drilling tool. Furthermore, instability affects the life of the drill bit, as in many instances, the bit is broken, damaged or made duller faster.

This invention overcomes these problems.

SUMMARY OF THE INVENTION

This invention generally relates to supplying a steady force to a drill bit and is particularly related to a portable means to do so for a right-angle drill tool.

An object of the invention is to provide a convenient, lightweight, and portable accessory that is ready and easily mounted to a right-angle drill, and which supplies such steady force to a drill bit.

Another object of this invention is to provide such force along a line coincident to the axis of the hole being drilled.

A further object of this invention is to provide a simple, quick, expedient, and accurate operation to the drilling of a hole.

Another object of this invention is to provide stability for the drill and its bit and thereby achieve quality for and accuracy to a drilled hole.

Another object of this invention is to provide an efficient, relatively inexpensive, and labor-and-cost saving device or accessory.

A further object of the invention is to provide longer life to tool bits.

These and other objects and advantages will become more apparent upon a full reading of the following description, the appended claims thereto, and the accompanying drawing.

BRIEF DESCRIPTION OF THE DRAWING

FIG. 1 is a full view of an embodiment of the invention;

FIG. 2 is an exploded fragmentary view, partly in cross-section, of such embodiment; and FIG. 3 is a view taken on line 3—3 of FIG. 2.

DESCRIPTION OF THE PREFERRED EMBODIMENT

Referring now to the drawing in which reference characters correspond to like numerals in the following description, reference character 10 refers to an embodiment or accessory comprehending the invention. The accessory 10 is cooperatively attached to a right-angle motorized tool 12, preferably as shown in FIG. 1; i.e., in alignment with the axis of a tool bit 14 held in a chuck 16 included as part of the tool 12. Tool 12 may be any conventional or well-known and commercially available right-angle drill tool, such as a multivane Ingersol-Rand air drill or a Rockwell air drill, which include air motors within their respective housings. The chuck 16 is suitably mounted at the end of a neck extension 17 extending from one end of the motor housing 18 for the tool 12 and through which extension 17 the chuck 16 is caused to be turned. Air from a conventional source is normally supplied to the other end of the tool 12 directly through a conventional fitting and conduit connection thereto, however, in the use of the embodiment disclosed herein, modification is made and as described hereinafter. The tool 12 forms no part of the invention, its operating mechanism is not described, and it should be understood that there is no change in operation of this tool during the operation of the accessory 10.

The accessory 10 comprises a metal cylinder or casing 20 (FIG. 2) having a chamber 22 therein in which a reciprocating piston 24 (with suitable O-rings) is mounted at one end of a plunger 26. The other end 27 of the plunger 26 projects out of the rear wall 28 of casing 20. The piston 24 is spring biased by means of a spring 30, as shown in FIG. 2. A passageway 34 in casing 20 provides communication between the chamber 22 on the side of the piston 24 opposite its side biased by spring 30 and a conduit 36 connected by a suitable fitting to the passageway 34 at its egress from the casing 20. At the other end of the conduit 36, a three-way valve 38 is suitably connected to regulate pressure input on operation and to bleed fluid volume from the piston chamber 22 in order to accomplish retraction of the drill bit 14 after operation. The inlet port for the three-way valve 38 is in turn connected by a suitable fitting to a two-way fluid delivering adapter 40 mounted at and fitted to the one end of the motor housing 18 and through which a fluid source, either air or hydraulic, is fed. Thus, a common source of power is conveniently provided by the adapter 40 for both the tool 12 and the accessory 10, however, it should be understood same is not necessary to the operation of the accessory 10.

The casing 20 and its interior elements as described above may take the form of a ram mechanism or means which is a readily available commercial unit such as a standard (hydraulic) RS 50–OH9 Enerpac unit, manufactured by the Enerpac Company, Bulter, Wisconsin 53007. The Electra Air Tool Company, 310 West Verdugo, Burbank, California, manufactures a three-way valve 38 unit as model No. 5030–05, otherwise identified as a Modernair valve, roller cam three-way. Equivalent units may also be utilized.

A separate bracket means 41, such as a metal body having a recess 42, is provided to mount the casing 20 to the tool 12, and is disposed on the front wall 44 in offset relation to the center line of the chamber 22 and its piston 24. The deepest point of its recess 42 is in vertical alignment with the center line of its chamber 22. The bracket 41 prevents interference from occurring between the front wall 44 of the casing 20 and any station or point along the length of the tool 20 in the event that the accessory is to be moved from one position to another along the length of the tool 12. The tool 12 usually has different diameters therealong, and it may be advantageous to move the casing 20 to various positions along its length, depending upon the particular drilling operation required at the time and the available access area in which the tool 12 and the accessory 10 find themselves.

A means 46 is provided to secure the casing 20 in a cooperative manner or relationship to the tool 12. The means 46 comprises a link chain 47, such as a bicycle-type chain made up of a plurality of spaced links joined together by pins. The one end of the chain 47 is attached to a pin 48 slidably mounted in a bore 50 provided in casing 20. The other end of pin 48 is threaded to receive a threaded Allen-headed nut 52 shouldered to the bore 50 as at 54. The other end of the chain 47 is positioned in a slot 56 provided in the casing 20 along a side opposing the bore 50. A metal flat 58 is suitably held (not shown) to the casing 20, and may be disposed in a shallow cavity in its one side wall, so that a cone screw 60 projects through a threaded aperture therein to engage a space provided between a pair of links of the link chain 47, as shown in FIG. 3.

Assembly of the accessory 10 is readily apparent, however, briefly, the pin 48 is introduced into the bore 50 for threaded securement to the nut 52. The other end of such chain is introduced into the slot 56 past the metal flat 58. The cone screw 60 may then be threaded through the metal flat 58 to engage the chain 47. The bore 50 and the slot 56 are, of course, arranged at opposite sides of the casing 20 along lines parallel to the plunger mechanism 24, 26 with no interfering therewith.

The accessory 10 is adjustably mounted to the device 12; i.e., along any station or at any suitable point of its length. Preferably, the plunger mechanism 24, 26 is aligned with the axis of the chuck 16. To so align, the cone screw 60 is loosened so that sufficient slack in the link chain 47 provides passage thereof over the chuck 16, after which the slack in the chain about the neck extension 17 is taken up by pulling the link chain 47 down further through the slot 56, keeping in mind proper positioning of the bracket 41 at the same time. The cone screw 60 is then again engaged to the link chain 47. A finer or tighter fit or securement of the mounting of the accessory 10 to the device 12 is accomplished by tightening the nut 52 against the shoulder 54 thereby drawing the pin 48 further into the bore 50.

The fitting at the one end of the conduit 36 is then fastened to the passageway 34 and its other end is fitted to the three-way valve 38 that has been suitably fastened to the adapter 40 through which a common source of fluid is supplied to both the drill tool 12 and the accessory 10.

In operation, taking air as an example of fluid utilizable with the invention, air is fed under full line pressure, say, 150 lbs. per sq. in., to the drill tool 12 through the adapter 40. The three-way valve 38 is modified in this embodiment by providing a rotating adjustment control element 64, in lieu of the conventional cam operated valve as purchased and indicated commercially available above. The element 64 is adjusted to bleed-off air through its exhaust port. Thereafter, as the control element 64 is turned, the egress port of the valve 38 connected to the conduit 36 begins to open while the bleed-off exhaust port begins to close. Thus, pressure is supplied to the mechanism 24, 26. The piston 24 is caused to retract in its chamber 22 against spring 30. Upon reversal of rotation of the three-way valve control element 64, air is bled off through its exhaust port, closing its source orifice.

At this point of the description, we assume that the exposed end 27 of the plunger 26 engages or in a rigid way physically abuts against a bracing structure which is fixed in reference to the workpiece held in a jig and against which the drill bit 14 is performing. Consequently, the ram means provides a force to the drill device and the drill bit 14 through reaction of the plunger 26 with the bracing structure.

The exposed end 27 of the plunger 26 includes an axially aligned threaded hole in which a set screw 66 is mounted and to which one or more extensions 68 may be secured, depending upon the distance existing between the workpiece and the bracing structure against which the ram means is reacting. Thus, one or a plurality of these extensions 68, all of which not necessarily of the same length, provide a convenient expedient to the operator in a given situation wherein the distance varies between the bracing structure and the workpiece.

After each hole in the workpiece has been drilled, the tool 12 is stopped, the action of the valve 38 is reversed, and the tool bit 14 is removed from the hole. In other words, the operator reverses the action of the three-way valve to bleed-off air presented to it while closing the egress port connected to the conduit 36. This is a very simple and quick operation for the operator as his one hand moves the tool 12 and its attached accessory 10 from one point to the next while his other hand grasps the three-way valve 38, in order to drill a plurality of holes in the workpiece.

It should now be evident that the ram means provides for an accurate drilling of a hole, with a desired stability (non-movement) for the tool 12 as it is drilling a hole therein.

The advantage of locating or positioning this invention directly in line with the center line of the chuck 16 becomes more evident in an application for the tool 12 in a restricted area for drilling caused by surrounding structural obstacles on a jig or back-up structure or chassis for a drill tool. A greater advantage is realized in a situation where the chuck 14 is not located at the end of a rigid neck extension 17, but rather at the end of a flexible cable through which suitable rotating mechanism for the chuck is provided.

It should also be noted that an interrupting three-way valve 38 may be mounted directly to the housing 18 of the tool 12, in relation to its drill control lever (not shown, but conventional) and in no way interfers with the operation of the invention. In this case, the interrupting valve would provide for an immediate preregulated amount of fluid into the ram means upon depressing the drill control lever. The drill control lever would actuate the valve through, say, a shut-off pin projecting from the valve housing and in line with such lever.

It should be understood also that the securing means 46 may take forms other than the link chain 47, such as but not limited to snugging devices, flexible cabling, or other known, conventional or expedient ways than as shown in FIG. 3; and elements 48, 52, 58 and 60 may then take corresponding changes to connect such forms to the casing 20. Also, the form of the separate bracket 42 may vary and be included, if desired, as an integral part of the casing 20, and, of course, need not be utilized in each instance of securement of the casing 20 to a right-angle drill.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:

1. An improvement in a portable right-angle drill tool accessory for providing a steady force against the tool's drill bit, the accessory comprising a casing containing a biased slidable piston in a hollow cylinder provided in said casing, said casing including a passageway to the cylinder for transmission of pressure against the piston to establish the force, the improvement comprising a bracket having means providing for adjustment of said casing relative to said right-angle drill tool, said bracket being mounted on said casing in offset relation to said piston and cylinder, a chain means mounted to said casing and about said bracket, said chain means having an end secured to said casing and having its length looped around said bracket means to return to said casing, and, means for securing such length to said casing upon mounting said bracket to the tool by encircling said chain means thereabout.

2. The improvement of claim 1 wherein said means in said bracket comprises a recess formed therein.

3. The improvement of claim 2 wherein said recess has a deepest point in alignment with the hollow cylinder.

* * * * *